United States Patent [19]

Howells et al.

[11] 4,425,070

[45] Jan. 10, 1984

[54] SEPARATED DISCARDS CARRIER

[75] Inventors: John N. M. Howells, Kittery, Me.; Drew W. Morris, Hampton; Richard L. Tichenor, Portsmouth, both of N.H.

[73] Assignee: Recycling & Conservation, Inc., Kittery, Me.

[21] Appl. No.: 35,802

[22] Filed: Jun. 14, 1979

[51] Int. Cl.³ .............................................. B65F 3/08
[52] U.S. Cl. ...................................... 414/498; 410/78; 410/84; 410/143; 414/536; 414/541; 414/542
[58] Field of Search ............... 414/409, 498, 499, 500, 414/501, 536, 540–542, 411, 387, 616, 658; 220/8

[56] References Cited

U.S. PATENT DOCUMENTS 1,208,005 12/1916 Reed ....................................... 220/8
2,914,205 11/1959 Trubinski ............................ 414/501
2,961,977 11/1960 Coleman ......................... 414/540 X
3,380,600 4/1968 Klanner et al. ................. 414/500 X
3,478,906 11/1969 Smith ................................... 414/411

OTHER PUBLICATIONS

SDC Separated Discards Carrier Brochure, May 5, 1978.

Primary Examiner—Robert G. Sheridan
Attorney, Agent, or Firm—Pearson & Pearson

[57] ABSTRACT

The driver's cab and the rearloading, trash compactor of a conventional compactor vehicle are mounted on an elongated frame to provide a central, longitudinally-extending, space for separated discards collection apparatus. A single vehicle, small crew and a single stop thus enables both resource recovery and refuse collection. A power telescopable paper rack, is located between a power dump glass bucket and a power dump can bucket on one side of the space with access at curbside level and a glass bin and can bin are roll supported on the other side of the space for off loading laterally when filled.

3 Claims, 5 Drawing Figures

SEPARATED DISCARDS CARRIER

BACKGROUND OF THE INVENTION

It has heretofore been proposed to provide a trash compactor vehicle with a trash compartment having one or more longitudinally extending partitions for separation of salable waste material from non-salable waste material as in U.S. Pat. No. 2,914,205 to Trubinski of Nov. 24, 1959.

It has also been proposed to provide a longitudinal partition in a compactor to divide the same into a combustible material compartment and a non-combustable material compartment and then to provide an incinerator in one compartment and a crusher in the other compartment as disclosed in U.S. Pat. No. 2,961,977 to Coleman of Nov. 29, 1960.

However, the systems proposed in these patents do not take into account the relative generation rates of the different trash components, they do not permit use of commercially available trash compactors and they do not enable on loading and off loading from curbside of the separated, recyclable, discards.

SUMMARY OF THE INVENTION

In this invention a conventional, commercially available, trash compactor of the rear loading type, is used, but it is mounted on an elongated frame of a cab over engine type truck so as to provide an intermediate, longitudinally, extending, space between cab and compactor. The intermediate space on one side of the vehicle, is occupied by a newspaper rack formed of inner and outer telescopable containers. One of a pair of loading buckets is located on each opposite side of the paper rack and all are at easily accessible curbside level reachable by the crew of the vehicle.

One loading bucket is for loading with glass and the other for metal cans, each being liftable in vertical tracks and then translatable on horizontal tracks until over its bin whereupon a trap door type bucket bottom is slidably opened to discharge the contents.

It is possible for one man, the truck driver, at a single stop to not only pick up mixed, non-recyclable refuse and place it in the compactor, but to also place the segregated cans in the can buckets, glass in the glass bucket and papers in the paper rack. Then, while the vehicle is on the run between stops, the compactor crushes the refuse while the buckets are lifted and dumped into their respective bins.

When the collection bins and rack are full, a stop is made at a recycling station, the bins being slid laterally off the vehicle on rollers onto an unloading platform and the paper rack being hoisted upward, outward and downward laterally, to ground level for emptying.

DESCRIPTION OF A PREFERRED EMBODIMENT

Figure 1:
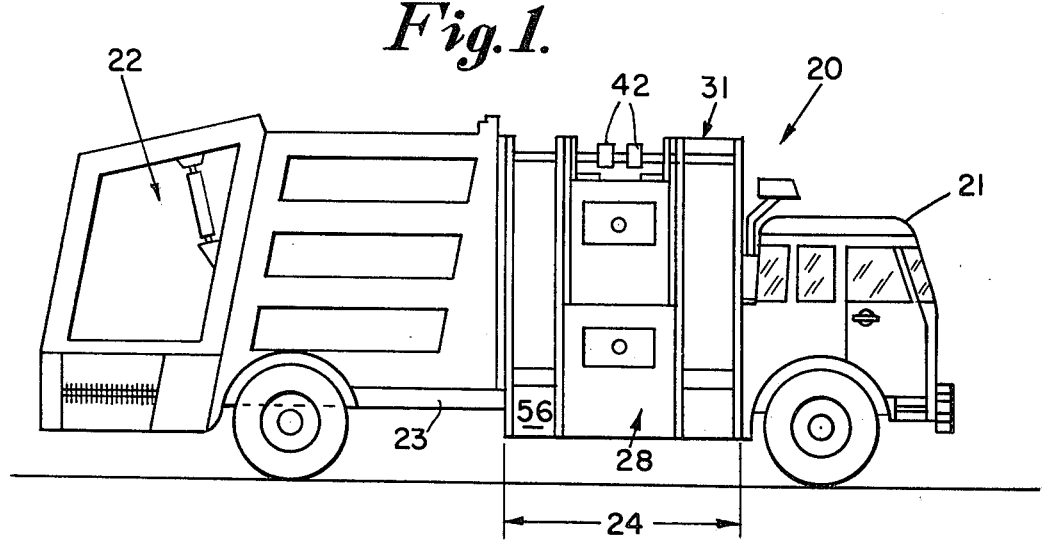
FIG. 1 is a side elevation from one side of the separated discards carrier of the invention.

In the drawings a conventional motor truck 20 is shown having a drivers cab 21 at the forward end, a conventional track compactor 22 of the rear loading type, at the rearward end and having a frame 23, elongated to provide a predetermined, longitudinally extending space 24 between cab and compactor.

The truck may be an International Harvester Cargostar Model Co-1950, capable of hauling a load of five and one half tons and the compactor may be a continuous feed "GRUNCHER" made by Wayne Engineering as Model 15.

The vehicle 20 is dual purpose in that it not only is capable of rear collection loading and compacting of nonrecyclable, mixed refuse, but it is also capable of curbside collection and loading of separated, recyclable discards such as glass 25, metal cans 26 and newspapers 27.

Figure 3:
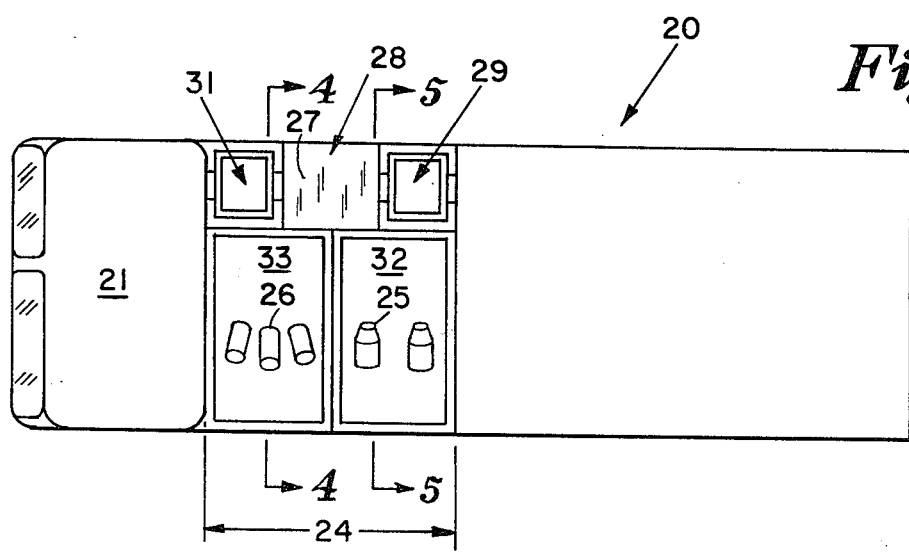
FIG. 3 is a schematic, top plan view thereof.

As shown diagramatically in FIG. 3, the space 24 includes on one side, the newspaper rack 28, with the glass loading bucket means 29 on one side thereof and the can loading bucket means 31 on the other side thereof. An open-topped, glass collection bin 32 and an open-topped, can collection bin 33 occupy the other side of the space 24, each being mounted on rollers 34, the rollers being supported in U-shaped channels 35 on frame 23.

Figure 2:
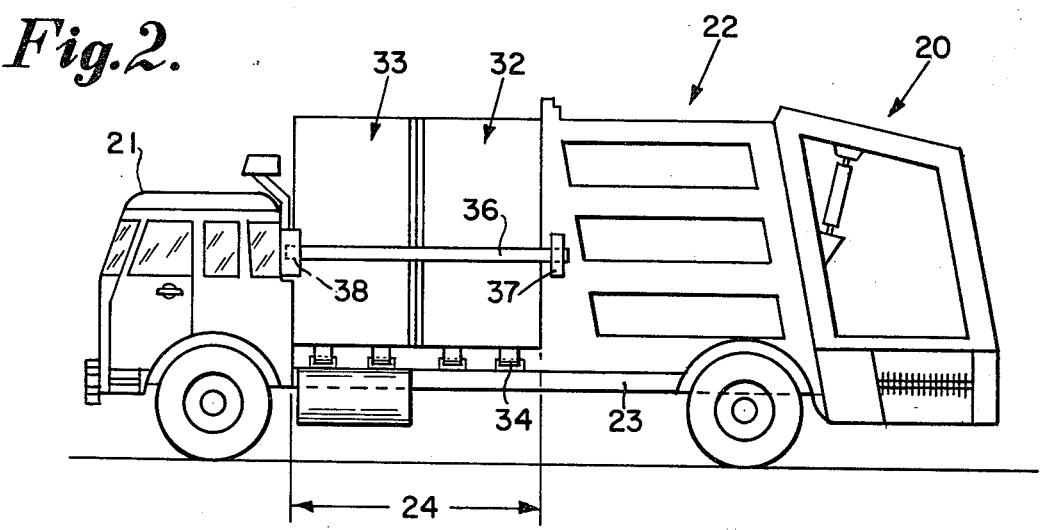
FIG. 2 is a side elevation from the other side thereof.

As best shown in FIG. 2 the side-by-side bins 32 and 33 are prevented from rolling laterally off the truck 20, in transit, by the longitudinally extending bar 36 in hook 37 and hole 38, but are easily rolled off the truck onto a suitable unloading platform at a recycling centre when bar 36 is removed. The paper rack 28 and loading bucket means, prevent roll off of the bins from the other side, in transit.

The paper rack 28 is formed of an inner container 39 telescoped within an outer container 41, to combine the necessities of maximizing the available capacity and minimizing the height at which the attendant has to reach up to load the papers. A self-contained, electric motorized hoist 42 and a pair of chains, such as 43, are provided to raise and lower the containers. The hoist 42 is mounted at the free terminal ends, such as 44, of a pair of arms, such as 45, each pivoted as at 46.

Figure 4:
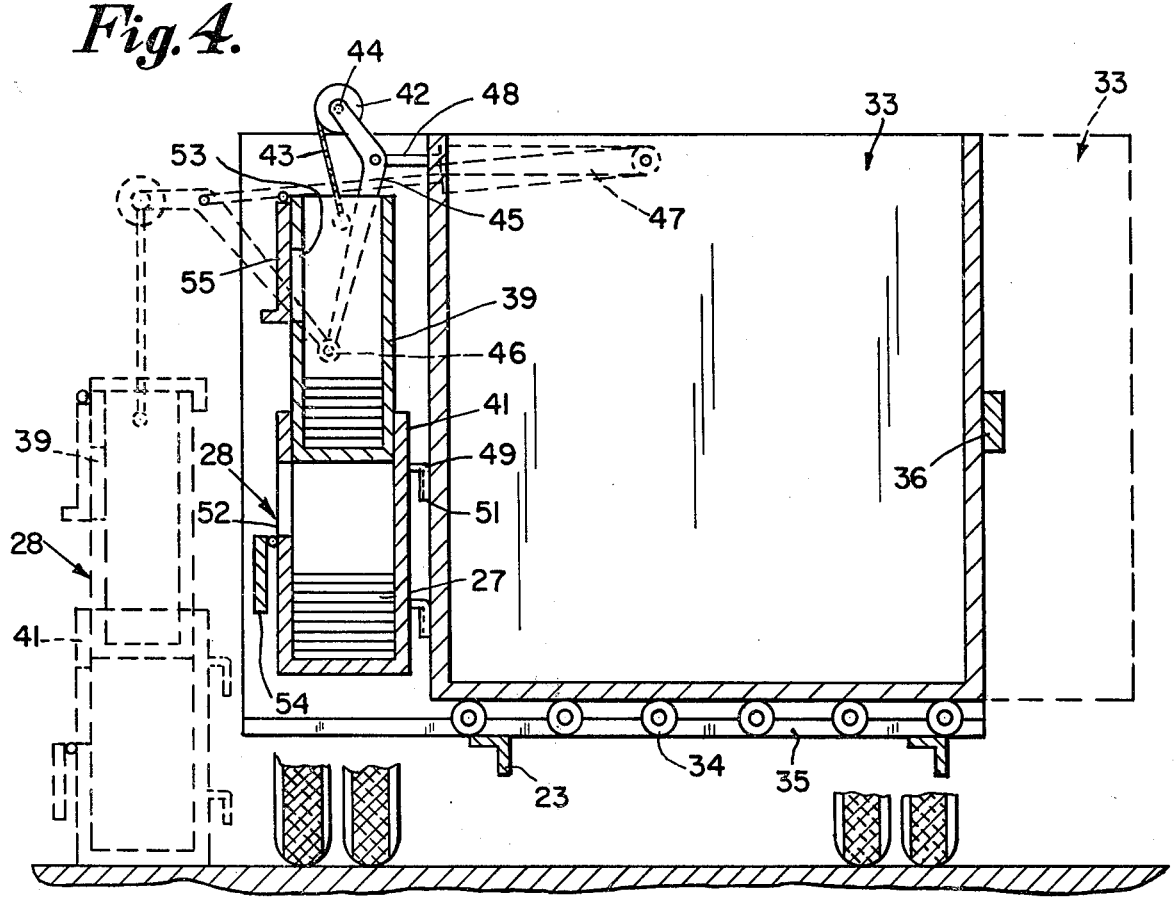
FIG. 4 is an end elevation, on an enlarged scale, on line 4—4 of FIG. 3 diagrammatically showing the paper rack and hoist.

Thus, a cylinder 47 and piston 48, after the hoist has lifted hooks 49 from eyes 51, to release the containers, can bodily transport the containers laterally away from the truck so that the hoist can lower them to ground level for unloading as shown in dotted lines in FIG. 4.

Each container 39 and 41 includes a front opening 52 or 53, which register with each other when the inner container is telescoped down within the outer container at curbside levels, thus the inner container is filled through the registered openings 52 and 53 and, when filled, the inner container is lifted to extended position, as shown, whereupon the outer container can be filled through its front opening 52. Pivoted door 54 covers opening 52, and pivoted door 55 not only covers opening 53 but also may serve as a cover, or lid, for the inner container.

While not shown, the containers 39 and 41 may each have bottoms in the form of pivoted trap doors, with suitable releases so that the loaded stacks of newspapers therein may be discharged through the bottom of the containers. Suitable outward extending lugs on the lower portion of the inner container and an inward extending lug, or flange on the upper edge of the outer container enable the outer container to be lifted when the inner container is lifted by the hoist.

The power driven loading bucket means 29 for glass 25 and power driven loading bucket means 31 for cans 26 are identical and only the means 29 will be described in detail below.

Each power driven loading bucket means such as 29 includes a bucket 56 having four upstanding side walls such at 57, an open top 58 and a slidable trap door bottom 59. Each bucket 56 is normally empty and located at curbside level, the bottom 59 being supported on rollers 61 and the rollers 61 being supported on a track extension 62 which joins a horizontal main track 63 extending over the open top of the bin 32. A pair of oppositely disposed, vertical tracks such as 64, in which rollers 65 are captive, guide the bucket 56, bottom 59 and track extension 62 upwardly, when it is desired to unload the bucket into the bin 32, by actuation of the power unit 66 and its chains 67 connected for raising and lowering of the bucket.

Figure 5:
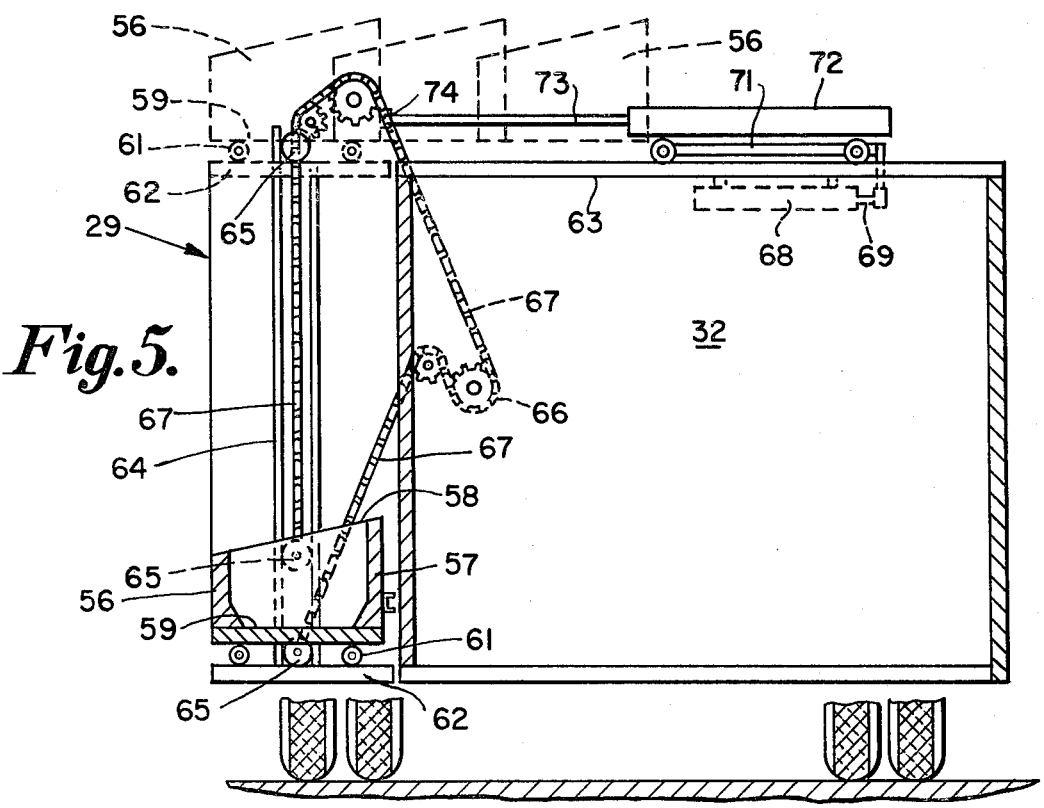
FIG. 5 is an end elevation similar to FIG. 4 on line 5—5 of FIG. 3 diagrammatically showing the glass and can loading bucket means.

Upon reaching the dotted line position shown at the left of FIG. 5, a cylinder 68 and piston 69 pushes a trolley 71 about one foot inwardly over the bin 32, carrying with it a cylinder 72 and piston 73 attached by a catch 74 to the combined bucket 56 and bottom 59 so that all move as a unit. Thereupon, automatically, the cylinder 72 pulls the piston and the upstanding four side walls 57 of the bucket further inwardly over the bin, and off the trap door bottom 59 to discharge the contents of the bucket into the bin. Upon discharge, the cylinder 68 and piston 73 return the bucket walls onto the bucket bottom the cylinder 68 and piston 69 return the bottom and bucket to the top of the vertical tracks and the power unit 66 returns the bucket, bottom and track extension to the full line position of FIG. 5.

Suitable electric circuitry, limit switches and the like, all of a type known in the mechanical and electrical arts, are provided to actuate the hoist 42, cylinder 47, power unit 66, cylinders 68 and 72 from switches accessible from curbside whereby mechanical action is automatic through a full cycle once initiated.

We claim:

1. A dual purpose trash compactor vehicle of the type comprising:
    a vehicle frame having a driver's cab separated by a space from a rear loading trash compactor;
    a glass collection bin, a can collection bin and a newspaper rack, all normally located in the space between said cab and compactor, power driven loading buckets normally located at curb side level but mechanically liftable up to the level of the tops of said bins for dumping cans and bottles therein, and means for off-loading said bins and rack, when filled, laterally of said vehicle and replacing the same, said vehicle characterized by;
    said newspaper rack being formed of an inner container telescoped within an outer container, each having a registering front opening for receiving newspapers, said telescoped containers being normally at curb side level but the inner container being liftable to extended position, when filled, to permit the outer container to be filled;
    and power means for lifting said inner container relative to said outer container and for bodily transporting both containers laterally off said vehicle.

2. A dual purpose trash compactor vehicle, capable of rapid on-loading, off-loading and segregation of both compacted trash and uncompacted recyclable refuse said vehicle comprising:
    a vehicle frame having a driver's cab separated by a space from a rear loading trash compactor;
    a glass collection bin, a can collection bin and a newspaper rack all normally located in the space between said cab and compactor;
    power driven loading bucket means in said space, including a plurality of open top, bottom discharge buckets for lifting and dumping cans and glass into their respective bins;
    means for off-loading said bins, when filled, laterally, of said vehicle, and replacing the same with empty bins;
    means for off-loading said rack, when filled, laterally of said vehicle and replacing the same with an empty rack;
    said newspaper rack being telescopable and including an inner container telescoped within an outer container, each container having front door openings which register with each other when said containers are telescoped;
    whereby newspapers can be loaded in said inner container through said openings while said telescoped containers are at curb side level, and said inner container raised to enable loading said outer container at curb side level.

3. A vehicle as specified in claim 2 wherein:
    said outer container is attached to said vehicle by downward extending hooks inserted in eyes attached to said vehicle.

* * * * *